(12) United States Patent
Patro et al.

(10) Patent No.: US 9,749,247 B1
(45) Date of Patent: *Aug. 29, 2017

(54) SYSTEM, METHOD, AND COMPUTER PROGRAM FOR TRANSMITTING NETWORK COMMUNICATIONS AT A POINT IN TIME AUTOMATICALLY DETERMINED BASED ON COMMUNICATION RATES

(71) Applicant: Amdocs Development Limited, Limassol (CY)

(72) Inventors: Debabrata Patro, Pune (IN); Anshoo Gaur, Pune (IN); Menachem Domb, Ramat Gan (IL)

(73) Assignee: Amdocs Development Limited, Limassol (CY)

(*) Notice: Subject to any disclaimer, the term of this patent is extended or adjusted under 35 U.S.C. 154(b) by 0 days.

This patent is subject to a terminal disclaimer.

(21) Appl. No.: 15/048,857

(22) Filed: Feb. 19, 2016

Related U.S. Application Data

(63) Continuation of application No. 13/044,481, filed on Mar. 9, 2011, now Pat. No. 9,301,315.

(51) Int. Cl.
  *G06F 15/16* (2006.01)
  *H04L 12/851* (2013.01)
  *H04L 29/08* (2006.01)

(52) U.S. Cl.
  CPC ........ *H04L 47/2433* (2013.01); *H04L 67/325* (2013.01)

(58) Field of Classification Search
  CPC .................. H04L 47/2433; H04L 67/325
  USPC .......................................... 709/233
  See application file for complete search history.

(56) References Cited

U.S. PATENT DOCUMENTS

| | | | | |
|---|---|---|---|---|
| 5,557,608 | A * | 9/1996 | Calvignac | H04L 12/5693 370/389 |
| 5,914,950 | A * | 6/1999 | Tiedemann, Jr. | H04L 47/10 370/335 |
| 5,959,945 | A * | 9/1999 | Kleiman | G07F 17/305 340/5.74 |
| 6,556,817 | B1 * | 4/2003 | Souissi | H04M 15/00 379/128 |
| 6,631,413 | B1 * | 10/2003 | Aggarwal | G06Q 10/08 709/219 |
| 6,959,327 | B1 * | 10/2005 | Vogl | H04L 12/5693 370/229 |
| 7,035,634 | B2 * | 4/2006 | Mead | G06Q 10/107 455/412.1 |
| 7,403,994 | B1 * | 7/2008 | Vogl | G06Q 10/06 370/230 |

(Continued)

*Primary Examiner* — Imad Hussain
(74) *Attorney, Agent, or Firm* — Zilka-Kotab, PC

(57) ABSTRACT

A system, method, and computer program product are provided for transmitting network communications at a point in time automatically determined based on communication rates. In use, a communication to be transmitted over a network is identified, utilizing a device. Additionally, a point in time at which to transmit the communication over the network is automatically determined by the device, utilizing at least one rate for the communication. Further, transmission of the communication over the network is initiated at the determined point in time, utilizing the device.

19 Claims, 5 Drawing Sheets

(56) References Cited

U.S. PATENT DOCUMENTS

| | | | | |
|---|---|---|---|---|
| 7,796,523 | B2* | 9/2010 | Amorello | H04L 47/10 370/237 |
| 8,121,140 | B2* | 2/2012 | McGuffin | H04B 7/18506 370/431 |
| 8,351,449 | B1* | 1/2013 | Shmulevich | H04L 47/568 370/229 |
| 9,007,908 | B2* | 4/2015 | Niyato | G06F 19/3418 370/235 |
| 9,301,315 | B1* | 3/2016 | Patro | H04W 72/1263 |
| 9,407,686 | B2* | 8/2016 | Runstedler | H04W 4/08 |
| 2001/0034789 | A1* | 10/2001 | Kumagai | H04L 12/14 709/233 |
| 2002/0075805 | A1* | 6/2002 | Gupta | H04L 12/2801 370/235 |
| 2002/0124111 | A1* | 9/2002 | Desai | H04L 12/2801 709/246 |
| 2002/0138854 | A1* | 9/2002 | Desai | H04L 12/2801 725/147 |
| 2002/0194108 | A1* | 12/2002 | Kitze | G06Q 30/0283 705/37 |
| 2003/0045273 | A1* | 3/2003 | Pyhalammi | H04L 12/14 455/412.1 |
| 2004/0002943 | A1* | 1/2004 | Merrill | H04L 41/0893 |
| 2004/0068570 | A1* | 4/2004 | Haller | G06Q 20/201 709/228 |
| 2005/0006467 | A1* | 1/2005 | Sweeney | G06Q 20/201 235/383 |
| 2005/0058149 | A1* | 3/2005 | Howe | H04L 47/10 370/428 |
| 2005/0129036 | A1* | 6/2005 | Sawabe | H04L 12/40143 370/401 |
| 2005/0286074 | A1* | 12/2005 | Atsumi | H04L 12/5693 358/1.15 |
| 2006/0168123 | A1* | 7/2006 | Krstulich | H04L 63/083 709/219 |
| 2007/0021110 | A1* | 1/2007 | Chaudhri | H04M 1/72566 455/418 |
| 2007/0043831 | A1* | 2/2007 | Kessler | H04L 67/34 709/219 |
| 2007/0091801 | A1* | 4/2007 | Shahidi | H04L 12/5695 370/230 |
| 2007/0168397 | A1* | 7/2007 | Satyanarayana | G06Q 10/10 |
| 2007/0171915 | A1* | 7/2007 | Toyama | H04L 12/5695 370/395.21 |
| 2007/0260673 | A1* | 11/2007 | Shenfield | G06F 17/30864 |
| 2007/0260718 | A1* | 11/2007 | Shenfield | G06F 17/3089 709/223 |
| 2008/0062881 | A1* | 3/2008 | Martin | H04L 12/5692 370/238 |
| 2008/0130852 | A1* | 6/2008 | Li | H04M 15/00 379/130 |
| 2008/0256272 | A1* | 10/2008 | Kampmann | H04L 29/06027 710/57 |
| 2011/0066742 | A1* | 3/2011 | Lee | H04N 21/23805 709/230 |

\* cited by examiner

SYSTEM, METHOD, AND COMPUTER PROGRAM FOR TRANSMITTING NETWORK COMMUNICATIONS AT A POINT IN TIME AUTOMATICALLY DETERMINED BASED ON COMMUNICATION RATES

CLAIM OF PRIORITY

This application is a continuation of U.S. application Ser. No. 13/044,481, filed Mar. 9, 2011, the entire contents of which is incorporated herein by reference.

FIELD OF THE INVENTION

The present invention relates to network communications, and more particularly to scheduling network communications.

BACKGROUND

Traditionally, network service providers charge a fee for consumption of their provided service (i.e. use of the network). For example, the network service providers generally charge a fee to a user for sending/receiving network communications. In some cases, these fees may vary depending on a time that a service is consumed. Specifically, the network service providers oftentimes vary the aforementioned fees according to usage patterns associated with the network (e.g. higher fees during periods of peak usage, etc.), in order to entice users to utilize the network outside of the periods of peak usage (i.e. at the times associated with lower fees).

Unfortunately, these varied fees have conventionally only been capable of influencing a limited amount of network communications. Namely, they have depended on a user knowing of the different rates and deciding to initiate the network communications based on such rates. This has therefore excluded network communications that are not necessarily initiated by a user. There is thus a need for addressing these and/or other issues associated with the prior art.

SUMMARY

A system, method, and computer program product are provided for transmitting network communications at a point in time automatically determined based on communication rates. In use, a communication to be transmitted over a network is identified, utilizing a device. Additionally, a point in time at which to transmit the communication over the network is automatically determined by the device, utilizing at least one rate for the communication. Further, transmission of the communication over the network is initiated at the determined point in time, utilizing the device.

DETAILED DESCRIPTION

Figure 1:
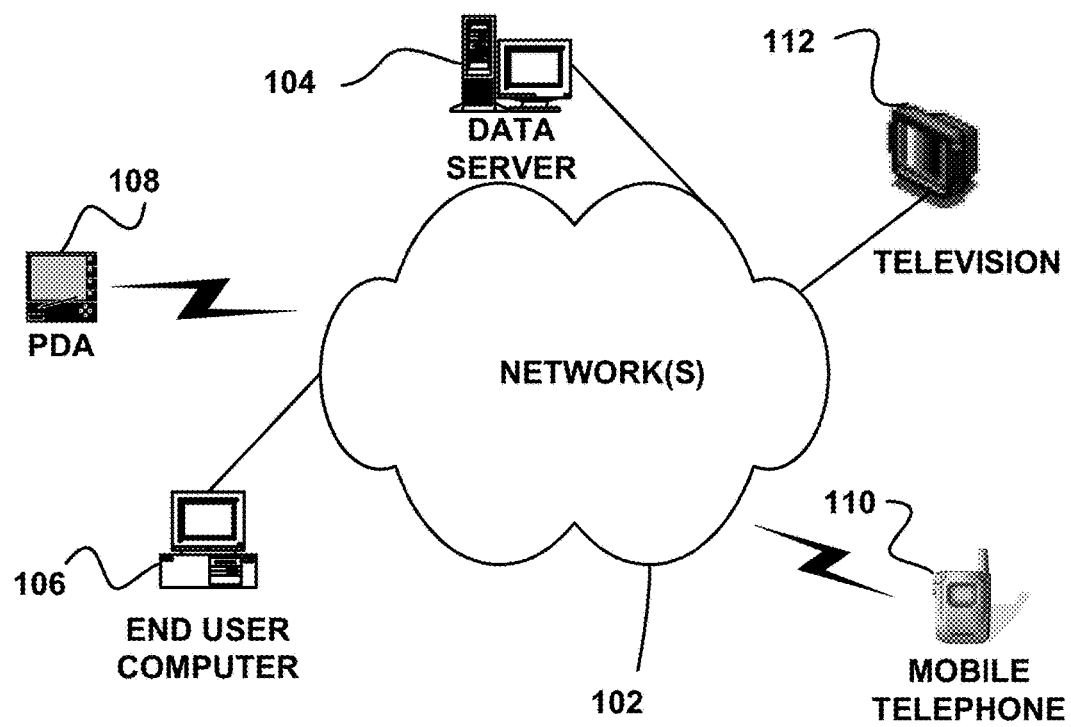
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
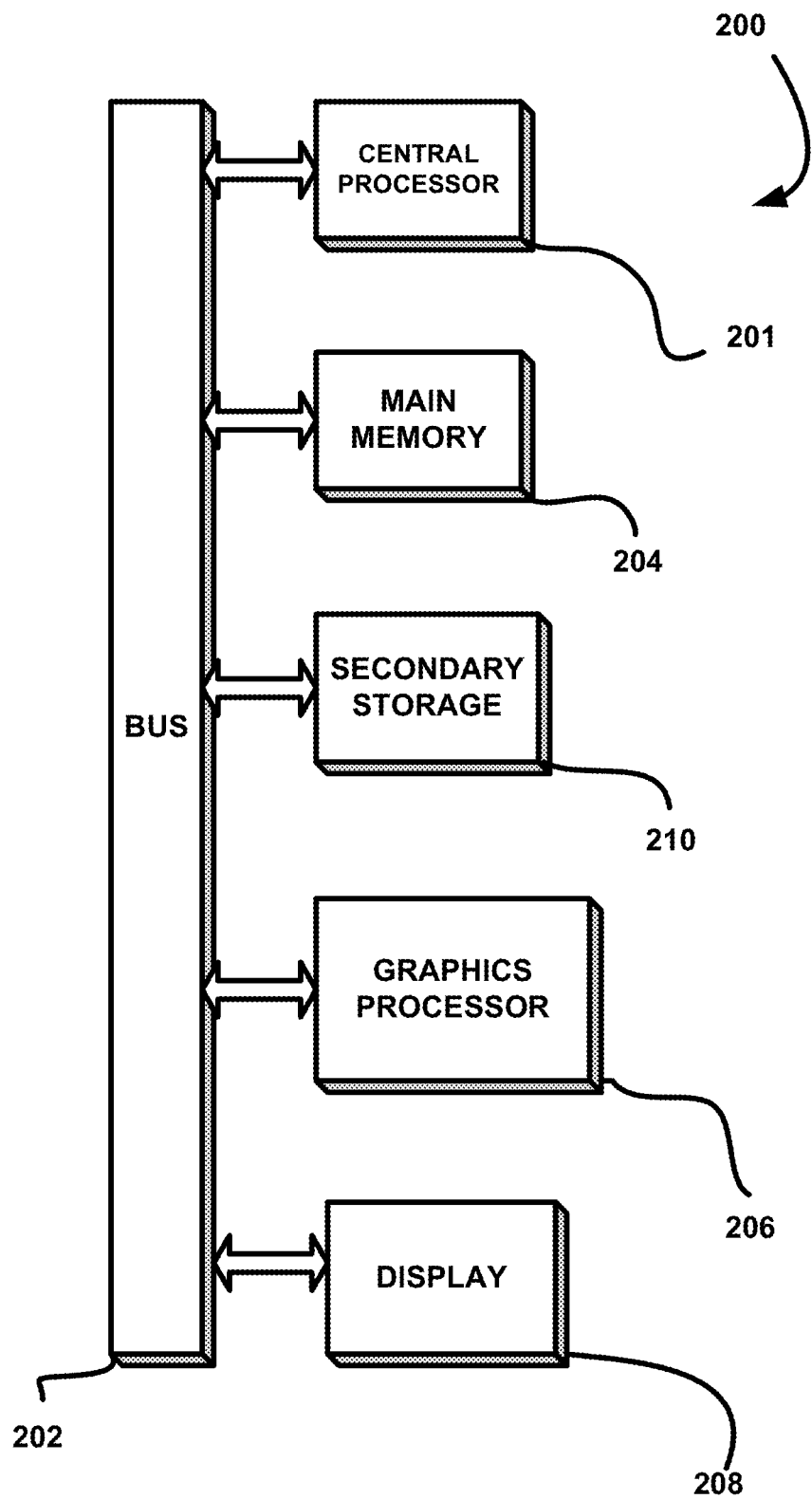
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
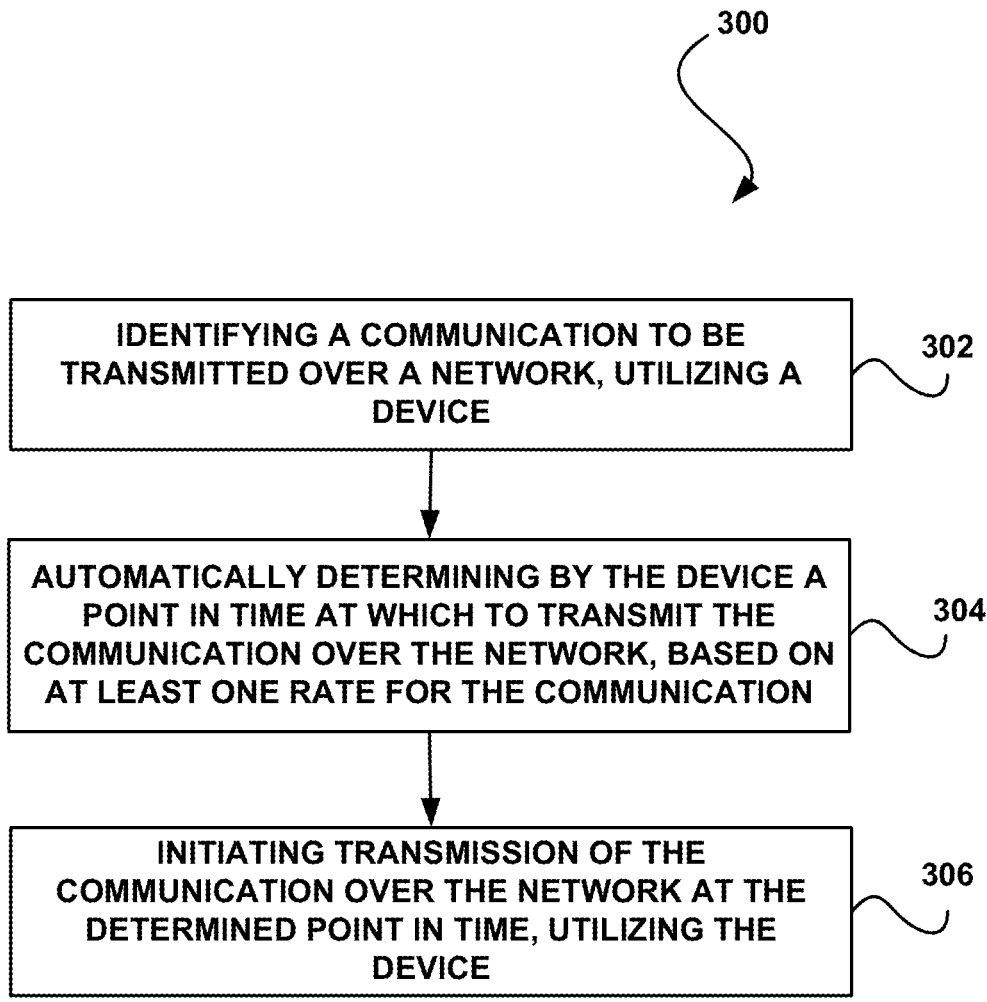
FIG. 3 illustrates a method for transmitting network communications at a point in time automatically determined based on communication rates, in accordance with one embodiment.

FIG. 3 illustrates a method 300 for transmitting network communications at a point in time automatically determined based on communication rates, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a communication to be transmitted over a network is identified, utilizing a device. With respect to the present description, the device includes any device (e.g. hardware and/or software) capable of identifying a communication to be transmitted over the network and initiating the transmission of the same. For example, the device may include an application and/or any of the devices described above with respect to FIGS. 1 and/or 2 (e.g. a desktop computer, lap-top computer, PDA, mobile phone, television, etc.). Similarly, the network may include any of the networks described above with respect to FIGS. 1 and/or 2 (e.g. the Internet, etc.).

Accordingly, the communication may include any data that may be transmitted over the network in association with the device. In one embodiment, the communication may include a communication to be received by the device via the network. As an option, the communication may be received by the device from another device on the network. Just by way of example, the communication may include downloading content or data (e.g. a webpage, a file, etc.) and/or streaming content or data (e.g. video, audio, etc.) to the device.

In another embodiment, the communication may include a communication to be sent by the device over the network. Optionally, the communication may be sent by the device to another device on the network. For example, the communication may include uploading content or data from the device. To this end, in the context of the present description, transmission of the communication may include sending or receiving the communication (i.e. by the device).

It should be noted that the communication may be identified in any desired manner. In one embodiment, the communication may be identified in response to a request from a user to transmit the communication. For example, the communication may be identified in response to a user requesting receipt of the content [e.g. entering a uniform resource locator (URL) associated with a webpage into a browser, selecting an option on a webpage or other graphical user interface (GUI) to download content, etc.].

In another embodiment, the communication may be identified in response to a request from an application on the device to transmit the communication. For example, the application may automatically (i.e. without user input) request the transmission of a communication over the network, such as requesting an updated set of data from a remote device on the network for use by the application. Such request may be made on a scheduled basis, in response to an event (e.g. occurring on the device), etc. In this way, the communication may not necessarily be associated with user input.

Additionally, as shown in operation 304, a point in time at which to transmit the communication over the network is automatically determined by the device, utilizing at least one rate for the communication. With respect to the present embodiment, the rate may include any rating capable of being utilized for rating transmission of the communication (e.g. by a provider of the network, etc.). For example, the rate may include a fee incurred by a user associated with the device (e.g. a subscriber to the network) for transmitting the communication.

To this end, the device may utilize a known rate(s) for the communication for automatically determining a point in time at which to transmit the communication. It should be noted that the rate(s) may be known by the device in any manner, for use in determining the point in time at which to transmit the communication. As an option, the rate(s) may be received directly from an entity using the rate(s) for rating network communications. For example, the rate(s) may be received by the device from a network service provider providing the network.

In one embodiment, the rate(s) may be received in response to a query for the rate(s) sent from the device to the network service provider. In another embodiment, the rate(s) may be received in response to a periodic transmission of the rate(s) by the network service provider to the device. Such periodic transmission may be associated with a time period during which the rate(s) is valid, in a further embodiment, such that a rate received at a first point in time may only be valid until an updated rate is received at a second point in time. Such valid time period may be set by the network service provider and indicated to the device with the associated rate.

Of course, while receipt of the rate(s) are described above as being directly received at the device from the network service provider, as another option, the rate(s) may similarly be received from a source separate from the network service provider. Just by way of example, the source may publish the rate(s) utilized by the network service provider when rating network communications.

Still yet, each rate may be associated with a different point in time. For example, a different rate (e.g. fee) may be incurred for transmission of the communication over the network for each of a plurality of different points in time. In one exemplary embodiment, a first fee may be associated with transmission of the communication over the network at a first point in time and a second fee may be associated with the transmission of the communication over the network at a second point in time, where the first fee is higher than the second fee and the first point in time is a point in time during which network usage is historically higher than at the second point in time.

In one embodiment, the different points in time may include different periods of time. For example, each point in time may include a particular time period (e.g. minutes, hours, days, or any combination thereof). Thus, automatically determining the point in time at which to transmit the communication over the network may include automatically determining during which of a plurality of different time periods the communication is to be transmitted over the network.

Moreover it should be noted that that the point in time at which the communication is to be transmitted over the network may be automatically determined in any manner that is based on the rate(s). As noted above, each rate may be associated with a particular point in time. Thus, one of the rates may be selected such that the communication is configured to be transmitted at the point in time associated with the selected rate.

Just by way of example, a lowest one of the rates may be determined. Consequently, one of the different points in time associated with the determined lowest rate may be identified. Of course, however, any predetermined algorithm (e.g. besides necessarily identifying the lowest rate) may be utilized to determine an optimal or otherwise desired rate (from the rates known by the device) at which the communication is to be transmitted.

Further, as shown in operation 306, transmission of the communication over the network is initiated at the determined point in time, utilizing the device. With respect to the present description, initiation of the transmission may include any command or operation resulting in transmission of the communication. For example, the initiating may be made by an application that received the request for the communication to be transmitted (e.g. a browser that received the request from the user) or the application that automatically made the request for the communication to be transmitted.

In one embodiment, where the communication includes downloading content at the device, initiating transmission of the communication may include initiating the downloading of the content at the device. For example, such initiation may include sending a request to a remote device storing the content to send the content to the device. In another embodiment, where the communication includes uploading content from the device, initiating transmission of the communication may including initiating (e.g. starting) the uploading of the content.

As noted above, the transmission of the communication over the network is made at the point in time that is automatically determined based on the rate(s) for the communication (as describe in operation 304). Thus, once the point in time is automatically determined, the transmission of the communication may optionally be scheduled for the determined point in time. In this way, the transmission of the communication may be initiated based on the scheduling of the transmission of the communication at the determined point in time.

In addition, in response to the initiation of the transmission of the communication over the network, a user associated with the device (e.g. the subscriber to the network) may be charged the rate associated with the determined point in time. To this end, a desired rate at which to a communication is be transmitted over the network may be automatically determined from available rates provided by the network service provider, and further charged to the user once the communication is transmitted.

This may allow the network service provider to assign different rates to various points in time for encouraging use of the network (via transmission of communications over the network) at particular ones of the various points in time (i.e. lower usage periods, etc.). Furthermore, a device initiating the communication over the network may automatically determine the point in time at which the communication is to be initiated, based on a selection of a desired one of the rates (e.g. as determined using an algorithm, etc.). Accordingly, the device, without necessarily requiring user intervention or analysis, may optimize or otherwise customize the rates charged to the user for network communications.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
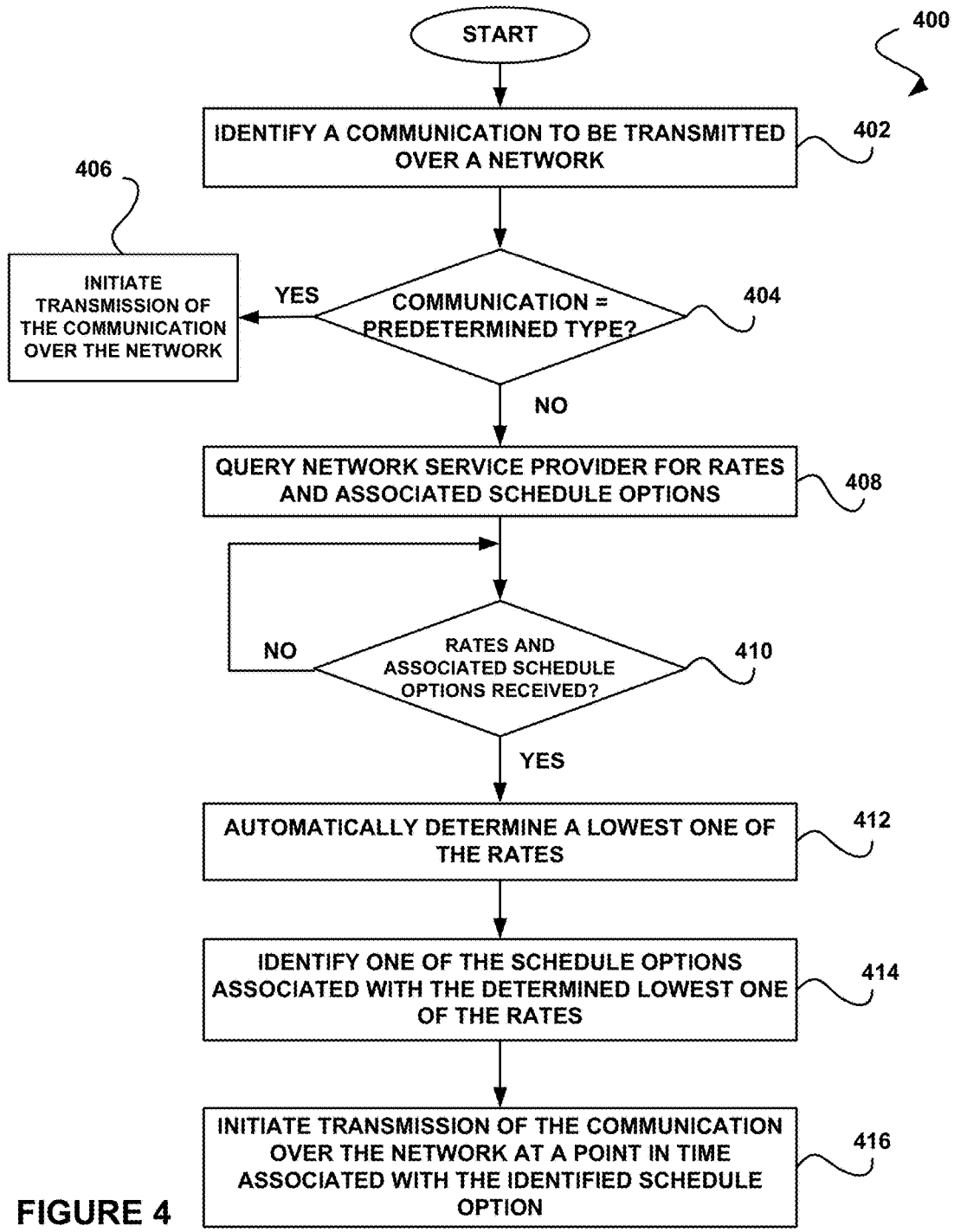
FIG. 4 illustrates a method for determining rates for transmitting a network communication, and scheduling transmission of the network communication based on the determined rates, in accordance with another embodiment.

FIG. 4 illustrates a method 400 for determining rates for transmitting a network communication, and scheduling transmission of the network communication based on the determined rates, in accordance with another embodiment. As an option, the method 400 may be carried out in the context of the details of FIGS. 1-3. Of course, however, the method 400 may be carried out in any desired environment. Further, the aforementioned definitions may equally apply to the description below.

As shown in operation 402, a communication to be transmitted over a network is identified. In one embodiment, the communication may be identified in response to a user request for the communication. In another embodiment, the communication may be identified in response to a request by an application for the communication.

In addition, it is determined whether the communication is of a predetermined type. See decision 404. Thus, a type of the communication may be determined. With respect the present embodiment, the type of the communication may include any one of a plurality of preconfigured classifications for communications. For example, the type may include a priority of the communication (e.g. high, medium, or low). Further, the predetermined type may include at least one of the aforementioned types which has been predetermined (e.g. high priority), the reasons for which will be set forth with respect to operation 406.

In one embodiment, the type may be based on a content of the communication. For example, different content may be associated with a different priority, such that communication of the same may be assigned such priority. Just by way of example, data on health monitoring may be assigned a high priority, such that a communication including data on health monitoring may be assigned the high priority. As another example, data on smart meter reading may be assigned a low priority, such that a communication including data on smart meter reading may be assigned the low priority.

In another embodiment, the type may be based on a destination of the communication (e.g. where different destinations are associated with different priorities), such that the communication may be assigned a priority associated with the destination. Of course, however, the type may be based on any characteristic of the communication.

If it is determined that the type of the communication is the predetermined type [e.g. that requires immediate transmission (e.g. health monitoring data)], the transmission of the communication over the network is initiated. Note operation 406. In this way, the remaining operations 408-416 of the method 400 may not necessarily be applied to communications of the predetermined type. For example, transmission of communications with a high priority may be initiated without the delays associated with the further operations 408-416 of the method 400.

However, if it is determined that the type of the communication is not the predetermined type, a network service provider is queried for rates and associated schedule options. Note operation 408. With respect to the present embodiment, the rates include rates according to which transmission of the communication will be rated. Additionally, the associated schedule options include points in time associated with each of the rates (e.g. during which each rate is applicable).

In one embodiment, the network service provider may be queried for the rates/schedules by sending the network service provider information associated with the communication. For example, a size of content included in the communication (e.g. a size of a file to be uploaded), a name of content included in the communication (e.g. a name of a file to be downloaded), a path to content included in the communication (e.g. a path to a file to be downloaded), any free download/upload allowance that is available for use and if there is any timing restrictions for them (e.g. download/upload allowance of 1 MB is available but can be used only between 00:00 to 06:00 hours), etc. In return, the network service provider may provide rates and associated schedule options specific to the aforementioned information included in the query. Optionally, the query may be sent over the network.

It is then determined whether the rates and associated schedule options have been received. Note decision 410. The rates and associated schedule options may be received in any desired format that associates with each rate a schedule option. For example, the rates may be received as a file, spreadsheet, etc. In addition, the rates and associated schedule options may be associated with a validity time period, such that the rates and associated schedule options may optionally only be valid during that validity time period. Further, the rates may be received over the network, as an option.

If it is determined that the rates and associated schedule options have not been received, the method 400 continues to wait for receipt of the rates and associated schedule options, as shown. Once the rates and associated schedule options have been received, a lowest one of the rates is automatically determined. Note operation 412. Of course, it should be noted that any other algorithm may be utilized to determine which one of the rates is desired with respect to transmission of the communication. In another optional embodiment, the algorithm my include criteria for selecting the option (e.g. a threshold, limit on total time period to wait for initiation of the communication, etc.), such if all of the rates/schedule options do not meet the criteria, none of the rates may be determined (and transmission of the communication delayed until receipt of a rate/schedule option meeting the criteria is received).

Furthermore, the one of the schedule options that is associated with the determined lowest one of the rates is identified, as shown in operation 414. As noted above, the schedule option includes a point in time during which the communication may be transmitted, where the transmission of such communication is rated at the associated rate. In one embodiment, the point in time may include a time period, such that the communication may be transmitted at any time during that time period in exchange for the associated rate.

Still yet, transmission of the communication is initiated over the network at a point in time associated with the identified schedule option. Note operation 416. In one embodiment, the communication may be buffered until the point in time associated with the identified schedule option. With respect to such embodiment, once it is determined that it is the point in time, the communication may be removed from the buffer and transmission of the communication may be initiated.

Figure 5:
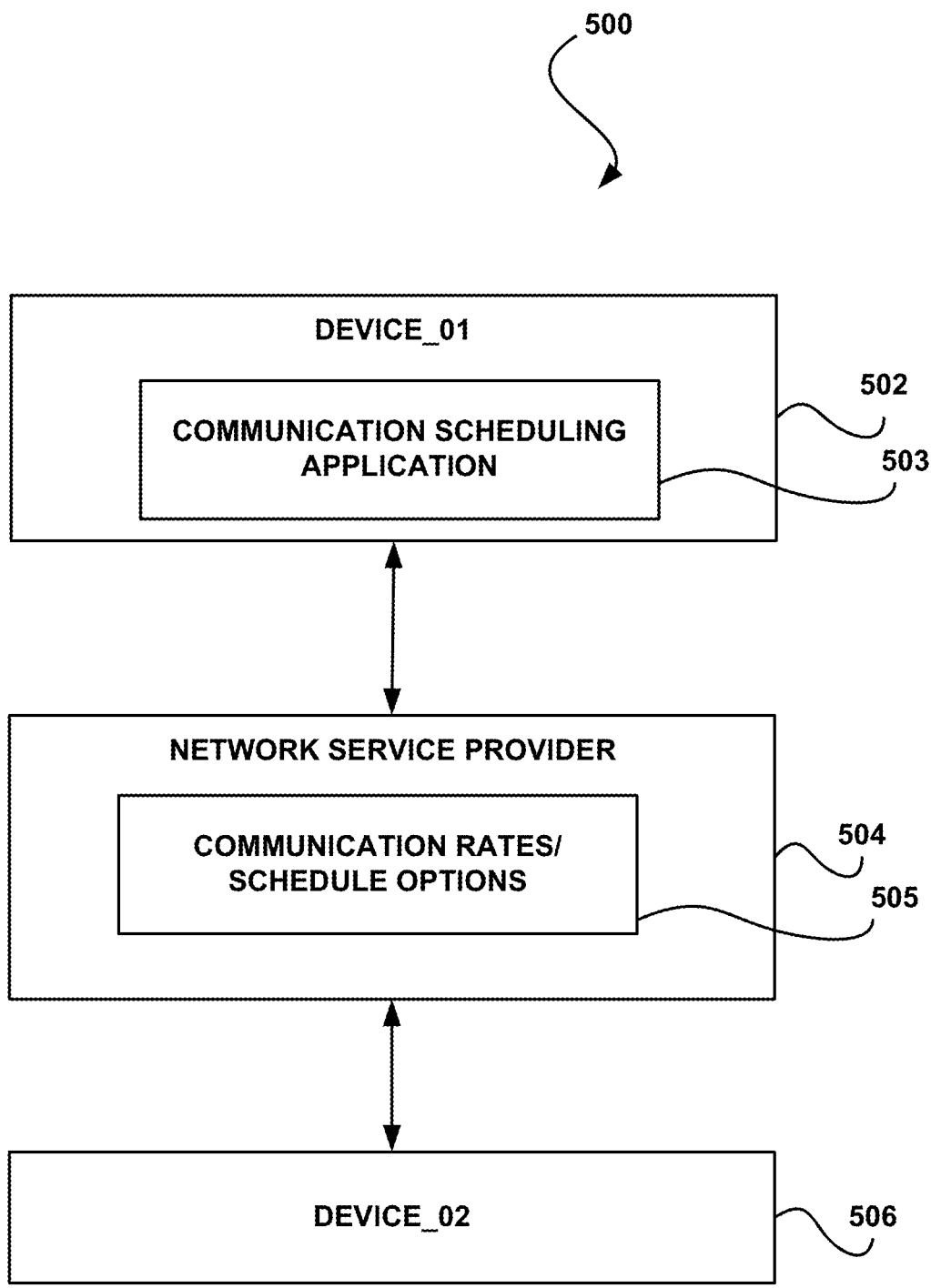
FIG. 5 illustrates a system for transmitting network communications at a point in time automatically determined based on communication rates, in accordance with yet another embodiment.

FIG. 5 illustrates a system 500 for transmitting network communications at a point in time automatically determined based on communication rates, in accordance with yet another embodiment. As an option, the system 500 may be implemented in the context of the details of FIGS. 1-4. Of course, however, the system 500 may be implemented in any desired environment. Further, the aforementioned definitions may equally apply to the description below.

As shown, a first device 502 is in communication with a second device 506 via a network provided by a network service provider 504. A user of the first device 502 and a user of the second device 506 may each be a subscriber to the network provided by the network service provider 504. Thus, the users may be billed by the network service provider 504 for their usage of the network.

The first device 502 includes a communication scheduling application 503 for identifying a communication to be transmitted over the network, automatically determining by the device a point in time at which to transmit the communication over the network, based on at least one rate for the communication, and initiating transmission of the communication over the network at the determined point in time, utilizing the device (e.g. as described in the method 300 of FIG. 3 and/or method 400 of FIG. 4). The communication scheduling application 503 includes logic (e.g. code) executable by a processor of the first device 502 to perform the aforementioned operations. It should be noted that, while not shown, the components and functionality of the first device 502 described below may also be relevant to the second device 506.

For example, in response to identification of a communication to be transmitted over the network in association with the second device 506, the first device 502 may query the network service provider 504 for rates and schedule options capable of being utilized by the network service provider 504 to rate transmission of the communication. The query may include information describing characteristics of the communication, as an option. For example, the query may indicate content to be included in the communication (e.g. a name, location, etc. of the content), or may even further include attributes of such content (e.g. a size of the content).

In response to receipt of the query, the network service provider 504 may identify rates and associated schedule options 505 stored by the network service provider 504. The rates/schedule options may include a subset of all rates/schedule options 505 stored by the network service provider 504. For example, the rates/schedule options 505 may include only those applicable to the information provided in the query.

The network service provider 504 may then provide the identified rates/schedule options 505 to the first device 502. In response to receipt of the identified rates/schedule options 505, the first device 502 may determine one of the rates, such that transmission of the communication may be initiated at a point in time during the schedule option that is associated with the determined rate. The communication may be stored in a buffer of the first device 503 until the point in time. At the point in time, the communication may be retrieved from the buffer and transmission of the communication may be initiated.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium embodying a computer program, comprising computer code for:
   identifying a communication to be transmitted over a network, utilizing a device of a subscriber of the network;
   conditionally assigning the communication a high priority, based on a content of the communication;
   when the communication is not assigned the high priority:
   querying a network service provider for a plurality of different points in time at which the communication is capable of being transmitted and associated rates for transmitting the communication over the network,
   receiving at the device from the network service provider the plurality of different points in time and the associated rates, in response to the querying,
   selecting, by the device from the received plurality of different points in time, a point in time of the plurality of different points in time, and
   initiating, at the selected point in time, transmission of the entirety of the identified communication over the network;
   when the communication is assigned the high priority:
   immediately initiating transmission of the entirety of the identified communication over the network,
   wherein immediately initiating the transmission of the entirety of the identified communication over the network when the communication is assigned the high priority includes bypassing the querying and the selecting otherwise performed when the communication is not assigned the high priority to avoid delay associated with the querying and the selecting.

2. The non-transitory computer readable medium of claim 1, wherein the communication includes downloading the content or data at the device.

3. The non-transitory computer readable medium of claim 1, wherein the communication includes uploading the content from the device.

4. The non-transitory computer readable medium of claim 1, wherein the computer program is operable such that the communication is identified in response to a request from a user to transmit the communication.

5. The non-transitory computer readable medium of claim 1, wherein the computer program is operable such that the communication is identified in response to a request from an application on the device to transmit the communication.

6. The non-transitory computer readable medium of claim 1, wherein each of the rates includes a fee incurred by the subscriber for transmitting the entirety of the identified communication at the associated transmission time.

7. The non-transitory computer readable medium of claim 1, wherein the computer program is operable such that the high priority is conditionally assigned to the communication based on a type of the communication.

8. The non-transitory computer readable medium of claim 1, wherein the point in time of the plurality of different points in time is selected automatically, by the device, utilizing a predetermined algorithm that includes criteria for selecting one of the different points in time.

9. The non-transitory computer readable medium of claim 8, wherein the criteria includes a limit on total time period to wait for initiation of the communication.

10. The non-transitory computer readable medium of claim 1, wherein conditionally assigning the communication the high priority, based on the content of the communication includes:
 assigning the communication the high priority when the content of the communication is associated with the high priority, and
 assigning the communication a lower priority than the high priority, when the content of the communication is associated with the lower priority.

11. The non-transitory computer readable medium of claim 1, wherein the query indicates attributes of the content, such that the received plurality of different points in time and the associated rates are determined by the network service provider as those applicable to the attributes of the content.

12. A method, comprising:
 identifying a communication to be transmitted over a network, utilizing a device of a subscriber of the network;
 conditionally assigning the communication a high priority, based on a content of the communication;
 when the communication is not assigned the high priority:
 querying a network service provider for a plurality of different points in time at which the communication is capable of being transmitted and associated rates for transmitting the communication over the network,
 receiving at the device from the network service provider the plurality of different points in time and the associated rates, in response to the querying,
 selecting, by the device from the received plurality of different points in time, a point in time of the plurality of different points in time, and
 initiating, at the selected point in time, transmission of the entirety of the identified communication over the network;
 when the communication is assigned the high priority:
 immediately initiating transmission of the entirety of the identified communication over the network,
 wherein immediately initiating the transmission of the entirety of the identified communication over the network when the communication is assigned the high priority includes bypassing the querying and the selecting otherwise performed when the communication is not assigned the high priority to avoid delay associated with the querying and the selecting.

13. The method of claim 12, wherein the communication includes downloading the content at the device.

14. The method of claim 12, wherein the communication includes uploading the content from the device.

15. The method of claim 12, wherein the communication is identified in response to a request from a user to transmit the communication.

16. The method of claim 12, wherein the communication is identified in response to a request from an application on the device to transmit the communication.

17. The method of claim 12, wherein each of the rates includes a fee incurred by the subscriber for transmitting the entirety of the identified communication at the associated transmission time.

18. The method of claim 12, wherein the high priority is conditionally assigned to the communication based on a type of the communication.

19. A system, comprising:
 a processor for:
 identifying a communication to be transmitted over a network, utilizing a device of a subscriber of the network;
 conditionally assigning the communication a high priority, based on a content of the communication;
 when the communication is not assigned the high priority:
 querying a network service provider for a plurality of different points in time at which the communication is capable of being transmitted and associated rates for transmitting the communication over the network,
 receiving at the device from the network service provider the plurality of different points in time and the associated rates, in response to the querying,
 selecting, by the device from the received plurality of different points in time, a point in time of the plurality of different points in time, and
 initiating, at the selected point in time, transmission of the entirety of the identified communication over the network;
 when the communication is assigned the high priority:
 immediately initiating transmission of the entirety of the identified communication over the network,
 wherein immediately initiating the transmission of the entirety of the identified communication over the network when the communication is assigned the high priority includes bypassing the querying and the selecting otherwise performed when the communication is not assigned the high priority to avoid delay associated with the querying and the selecting.

* * * * *